(No Model.)
J. A. BILLS.
STEAM JET PUMP.
No. 475,716. Patented May 24, 1892.
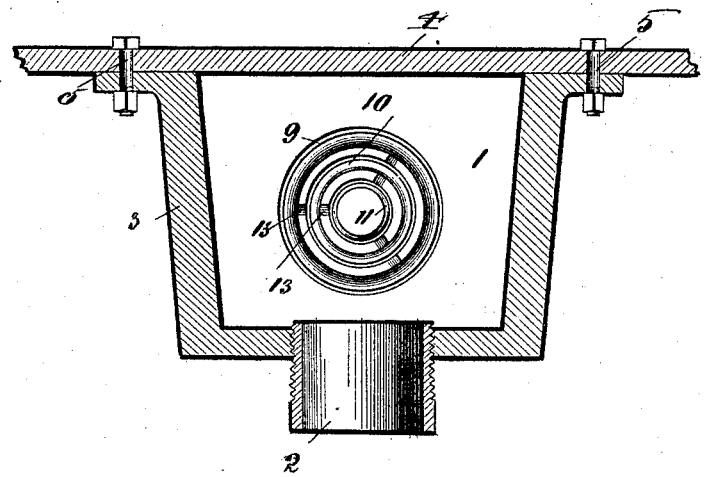
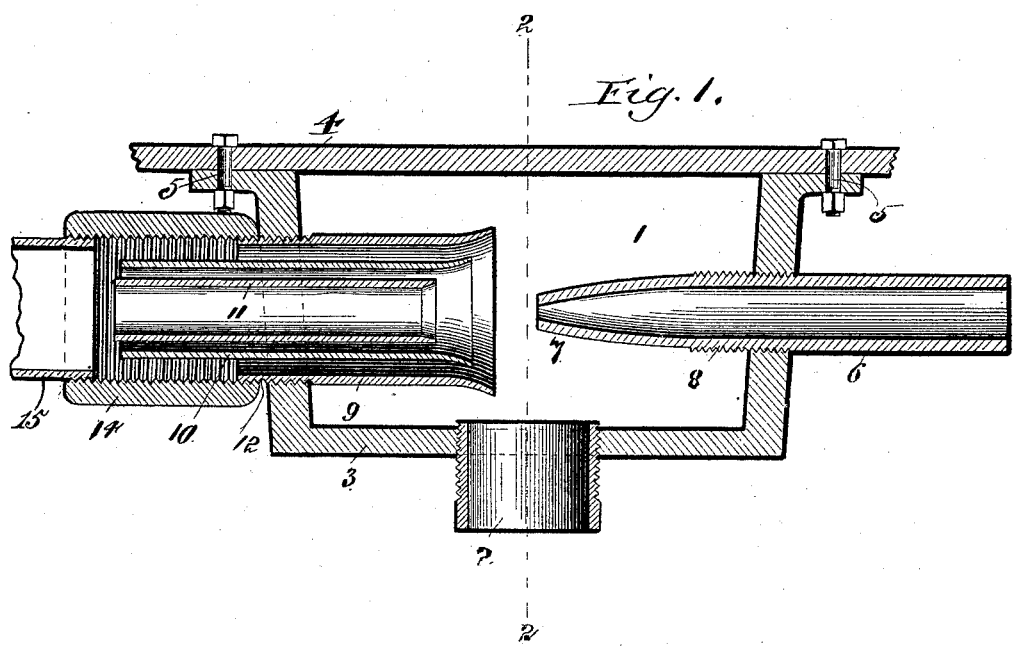
Witnesses
John L. Jackson
Ralph Vandyke
Inventor
James A. Bills.
By Bond & Adams
Attys.

UNITED STATES PATENT OFFICE.

JAMES A. BILLS, OF CHICAGO, ILLINOIS, ASSIGNOR TO HIMSELF AND JOHN VARTY, OF SAME PLACE.

STEAM-JET PUMP.

SPECIFICATION forming part of Letters Patent No. 475,716, dated May 24, 1892.

Application filed August 13, 1891. Serial No. 402,560. (No model.)

*To all whom it may concern:*

Be it known that I, JAMES A. BILLS, a citizen of the United States, residing at Chicago, in the county of Cook and State of Illinois, have invented certain new and useful Improvements in Steam-Jet Pumps, of which the following is a specification, reference being had to the accompanying drawings, in which—

Figure 1 is a central longitudinal vertical section, and Fig. 2 is a vertical cross-section on line 2 2 of Fig. 1.

My invention relates to steam-pumps, and more particularly to that class of steam-pumps which are designed to be used in pumping sand, mud, or other heavy matter in which the power of steam operates directly to do the work of pumping.

The object of my invention is to provide a new and improved pump of this description which may be used in pumping sand or mud and which will be both cheap and efficient. I accomplish this object as hereinafter specified, and as illustrated in the drawings. That which I deem to be new will be pointed out in the claims.

In the drawings, 1 indicates a chamber, which is connected by means of a pipe 2 with the supply of matter to be pumped. The chamber 1 is preferably rectangular in shape and is formed by securing a plate 4 upon a metallic box 3. The points of contact of the edges of the box 3 and plate 4 are made to fit tightly, so that the chamber 1 may be hermetically sealed. The box 3 and plate 4 are preferably secured together by means of bolts 5, as shown in the drawings.

6 indicates a steam-pipe, which extends through a suitable opening in one side of the box 3 into the chamber 1 and is fitted tightly in the side of the box through which it projects. The end of the pipe 6 which extends into the chamber 1 is contracted, as shown at 7 in Fig. 1, to form a nozzle, so that the steam as it passes through the pipe 6 will issue from the pipe in the form of a fine jet.

8 indicates screw-threads which are formed in the exterior portion of the pipe 6, as shown in Fig. 1, which screw-threads are adapted to screw into threads formed in the side of the box 3, whereby the pipe 6 may be adjusted longitudinally.

9, 10, and 11 indicate concentric pipes which extend into the chamber 1 at a point opposite the nozzle 7, as shown in Fig. 1. The largest pipe 9 is provided with external screw-threads 12 at one end, which are adapted to be screwed into threads formed in the box 3, by means of which the pipe 9 is secured in place. The pipes 10 and 11 are each provided with fins 13. The fins upon the pipe 10 project sufficiently from said pipe to engage the inner surface of the pipe 9, and the fins upon the pipe 11 project sufficiently to engage the inner surface of the pipe 10, whereby the several pipes are securely held in place. Each of the pipes 10 and 11 is preferably provided with three fins, as indicated in Fig. 2; but, if desired, the number may be varied, and instead of providing continuous fins lugs may be cast on the exterior surfaces of the pipes at suitable points to secure the pipes in place. The end of each of the pipes 9, 10, and 11 which projects into the chamber 1 is flared, as shown, so as to present a larger opening for the admission of the sand or other matter.

14 indicates a coupling which is screwed upon the outer end of the pipe 9, which extends through the side wall of the box 3, as shown, and is screw-threaded to receive the coupling. A pipe for delivering the sand or mud to any desired point may be connected with the pipes 9, 10, and 11 by means of the coupling 14 in the usual manner. The outer ends of the pipes 10 and 11 extend a short distance beyond the outer end of the pipe 9, as shown. The inner ends of the pipes 10 and 11 terminate at successively greater distances from the nozzle 7, as shown in Fig. 1, and the several pipes are of such diameter that a narrow space will be left between each of the pipes, as shown. The supply-pipe 2 is preferably located at a point under the end of the nozzle 7 and the opening into the pipe 9, as best shown in Fig. 1.

The operation of my improved pump is as follows: A supply of steam under pressure is supplied through the pipe 6 and is directed from the nozzle 7 into the pipe 11. This creates a vacuum in the chamber 1, causing an inflow of the sand and water or mud through the feed-pipe 2 into the chamber. The continued action of the steam-jet will then cause a flow of the sand or mud through the several pipes 9, 10, and 11 into the delivery-pipe at the outside of the pump, through which it may be carried to any desired point. The peculiar arrangement of the pipes 9, 10, and 11 causes a division of the particles of sand and mud and prevents its becoming packed at any point and also subjects the sand or mud in smaller particles to the action of the steam, and it is thereby carried much more easily than it would be if it were carried in a solid mass. After the sand has reached the delivery-tube it is subjected to the direct action of the steam and may then be forced along more readily in mass. When it is desired to gain access to the interior of the chamber, the plate 4 may be removed by loosening the bolts 5.

By constructing the pump as above described I am enabled to pump water containing a much larger percentage of sand or mud than it has heretofore been possible to pump and also to raise it higher.

That which I claim as new, and desire to secure by Letters Patent, is—

1. The combination, with a closed chamber having a supply-pipe at one point and a delivery-pipe, of a steam-pipe extending into the chamber and cylindrical outlet-pipes communicating at one end with the delivery-pipe and opening at the opposite end into the closed chamber, said cylindrical pipes being concentric with each other and the innermost pipe being arranged at the greatest distance from the steam-pipe, substantially as described.

2. The combination, with the closed chamber having a supply-pipe 2 and a delivery-pipe 15, of a steam pipe 6, extending into the closed chamber, and cylindrical outlet-pipes 9, 10, and 11, extending successively farther into the closed chamber and terminating at a short distance from the inner end of the steam-pipe, said cylindrical pipes being concentric with each other and having their axes in line with the axes of the steam-pipe and delivery-pipe and the innermost cylindrical pipe arranged at the greatest distance from the inner end of the steam-pipe, substantially as described.

3. The combination, with the closed chamber having a supply-pipe 2 and a delivery-pipe 15, of a steam-pipe 6, extending into the closed chamber at one side thereof, and a series of cylindrical concentric pipes 9, 10, and 11, supported by the opposite side of the casing and interposed between the steam-pipe and the delivery-pipe, the innermost cylindrical pipe being arranged at the greatest distance from the inner end of the steam-pipe, substantially as described.

JAMES A. BILLS.

Witnesses:
ALBERT H. ADAMS,
JOHN L. JACKSON.